US011157991B2

(12) United States Patent
Corlett et al.

(10) Patent No.: US 11,157,991 B2
(45) Date of Patent: *Oct. 26, 2021

(54) MANAGEMENT OF REVISIONS ON REVISIONS OF ORDERS

(71) Applicant: Oracle International Corporation, Redwood Shores, CA (US)

(72) Inventors: Marc Corlett, Bolton, CA (US); Brian Dueck, Collingwood, CA (US); Amir-Behzad Roshan-Pazhouh, Richmond Hill, CA (US); Daniel Ho, Thornhill, CA (US)

(73) Assignee: Oracle International Corporation, Redwood Shores, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 16/504,678

(22) Filed: Jul. 8, 2019

(65) Prior Publication Data
US 2019/0333132 A1    Oct. 31, 2019

Related U.S. Application Data

(63) Continuation of application No. 14/877,603, filed on Oct. 7, 2015, now Pat. No. 10,387,944.

(51) Int. Cl.
*G06Q 30/06* (2012.01)
*G06Q 10/06* (2012.01)

(52) U.S. Cl.
CPC ... *G06Q 30/0635* (2013.01); *G06Q 10/06312* (2013.01); *G06Q 10/063114* (2013.01)

(58) Field of Classification Search
CPC ......... G06Q 30/0635; G06Q 10/06312; G06Q 10/063114
See application file for complete search history.

(56) References Cited

U.S. PATENT DOCUMENTS

| 5,666,493 | A  | 9/1997 | Wojcik et al. |
| 5,737,498 | A  | 4/1998 | Murray |
| 5,745,687 | A  | 4/1998 | Randell |
| 6,058,373 | A  | 5/2000 | Blinn et al. |
| 6,539,386 | B1 | 3/2003 | Athavale et al. |
| 7,024,423 | B1 | 4/2006 | Aboujaoude et al. |
| 7,096,189 | B1 | 8/2006 | Srinivasan |

(Continued)

FOREIGN PATENT DOCUMENTS

| EP | 1892966 A1 | 2/2008 |
| WO | 01/06430 A1 | 1/2001 |

OTHER PUBLICATIONS

"Rapid Offer Design and Order Delivery"; Oracle Communications; an Oracle White Paper, May 2010; http://www.oracle.com/us/industries/communications/049176.pdf.

(Continued)

*Primary Examiner* — Nadja N Chong Cruz
(74) *Attorney, Agent, or Firm* — Invoke

(57) ABSTRACT

A method for managing a current revision on prior revision of an order is described. A modified set of compensations tasks for addressing amendments indicated in the current revision are determined. The modified set of compensation tasks may be determined by carrying over one or more compensation tasks, associated with the prior revision, that have not yet been completed. Alternatively or additionally, the modified set of compensation tasks may be determined by adding new compensation tasks based on the current revision.

20 Claims, 5 Drawing Sheets

(56) References Cited

U.S. PATENT DOCUMENTS

| | | |
|---|---|---|
| 7,379,909 B1 | 5/2008 | Cruz et al. |
| 7,448,046 B2 | 11/2008 | Navani et al. |
| 7,469,219 B2 | 12/2008 | Goldberg |
| 7,571,123 B1 | 8/2009 | Hill et al. |
| 7,640,213 B2 | 12/2009 | Reunert et al. |
| 7,693,791 B2 | 4/2010 | Hahn-Carlson et al. |
| 7,707,055 B2 | 4/2010 | Behmoiras et al. |
| 7,729,944 B1 | 6/2010 | Peyser et al. |
| 7,765,291 B1 | 7/2010 | Khan et al. |
| 2003/0171962 A1 | 9/2003 | Hirth et al. |
| 2004/0220937 A1 | 11/2004 | Bickford et al. |
| 2005/0004826 A1 | 1/2005 | Chen et al. |
| 2005/0102192 A1 | 5/2005 | Gerrits et al. |
| 2005/0197910 A1 | 9/2005 | Wittmer et al. |
| 2005/0289013 A1 | 12/2005 | Goldberg |
| 2007/0050224 A1 | 3/2007 | Malitski |
| 2008/0120189 A1 | 5/2008 | Singh et al. |
| 2009/0012828 A1 | 1/2009 | Brower et al. |
| 2009/0043673 A1 | 2/2009 | Caballero et al. |
| 2010/0121740 A1 | 5/2010 | Reed et al. |
| 2010/0223159 A1 | 9/2010 | Mackay et al. |
| 2010/0281456 A1 | 11/2010 | Eizenman et al. |
| 2011/0218924 A1 | 9/2011 | Addala et al. |
| 2011/0218925 A1 | 9/2011 | Addala et al. |
| 2011/0302132 A1 | 12/2011 | Muthuvelu |
| 2012/0150582 A1 | 6/2012 | Dueck |
| 2012/0150693 A1 | 6/2012 | Dueck et al. |

OTHER PUBLICATIONS

Amdocs, "Service Order Management," http://www.amdocs.com/products/oss/service-management/Pages/Service-Management.aspx (last visited Mar. 2, 2012).

Daniel L. Moody et al.; "A Decomposition Method for Entity Relationship Models: A Systems Theoretic Approach" 1st International Conference on Systems Thinking in Management; 2000; pp. 462-469; http://citeseerx.isl.psu.edu/viewdoc/summary?doi=10.1.1.142.8729&rep=rep1&type-pdf.

Daniela Wunsch et al.; "Multilevel Order Decomposition in Distributed Production"; http://www.iiss.oeaw.ac.al/files/pub/2007-ETFA-Multilevel-Order-Decomposition-in-Distributed-Production.pdf; 2007.

Gera A. Welker et al.; "Formalisation of the Ordering Process"; SOM0theme A: Primary processes within firms 2002; http://www.som.eldoc.ub.rug.nl/FILES/reports/themeA2002/02A08/02A08.pdf.

H.J. Pels et al.; "Decomposition of Information Systems for Production Management"; North Holland Computers in Industry 6 (1985); 435-452; pp. 25-38; http://alexandria.tue.nl/repository/freearticles/612129.pdf.

HP Operations Orchestration Software https://h10078.www1.hp.com/cda/hpms/display/main/hpms_content.jsp?zn=bto&cp=1-11-271-273%5E14694-4000-100 (Copyright) 2010 Hewlett-Packard Develpment Company, L.P.

Martin Owen et al.; BPMN and Business Process Management Introduction to the New Business Process Modeling Standard; (Copyright) Pokin Software 2003; http://www.omg.org/bpmn/Documents/6AD5D16960.BPMN_and_BPM.pdf.

NetCracker Order Management; the Order Management Challenge; NetCracker Technology Corp.; Waltham, MA; http://www.netcracker.com/clmmon/pdf/NetCracker_Order_Management.pdf; downloaded Dec. 15, 2010.

Oracle Data Sheet; "Oracle commuinications Rapid Offer Design and Order Delivery Solution"; Copyright 2009, Oracle; http://www.oracle.com/US/industries/communicatins/rapid-offer-design-order-wp-077276.pdf.

Oracle, "Oracle(Registered) Communications Order and Service Management", Mar. 2013, 348 pages.

Siebel Order Management—An Overview; Siebel Expert Services; http://siebeloracle.wordpress.com/2009/06/20/siebel-order-management-ther-order-management-life-cycle; Jun. 20, 2009.

Svetlana Mansmann et al.; "Hierarchy-driven Visual Exploration of Multidimensional Data Cubes"; University of Konstanz, Germany, Department of Computer & Information Science; pp. 96-111; 2007; http://www.inf.uni-konstanz.de/cgip/bib/files/MaMaSc07.pdf.

TeleManagement (TM) Forum, "High-Level Guide for Managers: The Information Framework," Mar. 2010, TMFManager_Guides_InformationFramework.pdf, http://www.tmforum.org/BestPractices-Standards/InformationFramework/1684/Home.html (last visited Mar. 2, 2012).

TIBCO, "Order Management," http://www.tibco.com/industries/telecommunications/fulfillment-orchestration/order-management/default.jsp (last visited Mar. 2, 2012).

Vitria: Order AccelertorTM, Integrated Order Management; Vitria Telecommunications; (Copyright) 2004 Vitria Technology, Inc.; http:www.eaibrasil.com.br/documentos/ingles/downlaod.php?file=vitria_voa_brochure.pdf.

MANAGEMENT OF REVISIONS ON REVISIONS OF ORDERS

INCORPORATION BY REFERENCE; DISCLAIMER

Each of the following applications are hereby incorporated by reference: application Ser. No. 14/877,603 filed on Oct. 7, 2015; application Ser. No. 13/315,692, filed Dec. 9, 2011. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to order and service management systems. In particular, the present disclosure relates to managing amendments on amendments in order and service management systems.

BACKGROUND

Order and service management (OSM) systems are configured to coordinate tasks for completing a customer order. These tasks may involve various fulfillment systems, including, but are not limited to, provisioning, shipping, inventory, and billing.

In an example, a telecommunications provider may receive orders for telecommunications services, such as telephone services, Internet services, and cable television (TV) services. Each service may have different configurations. A telephone service may or may not include long distance calling, voicemail, or other features. An Internet service may be configured at various speeds. A cable TV service may or may not include certain TV channels.

The telecommunications provider may use an OSM system to coordinate tasks for completing orders for various services. Tasks for telephone services may include provisioning a telephone line and a telephone number, and billing the customer. Tasks for Internet services may include provisioning Internet services at a particular speed, shipping a router to a customer, and billing the customer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
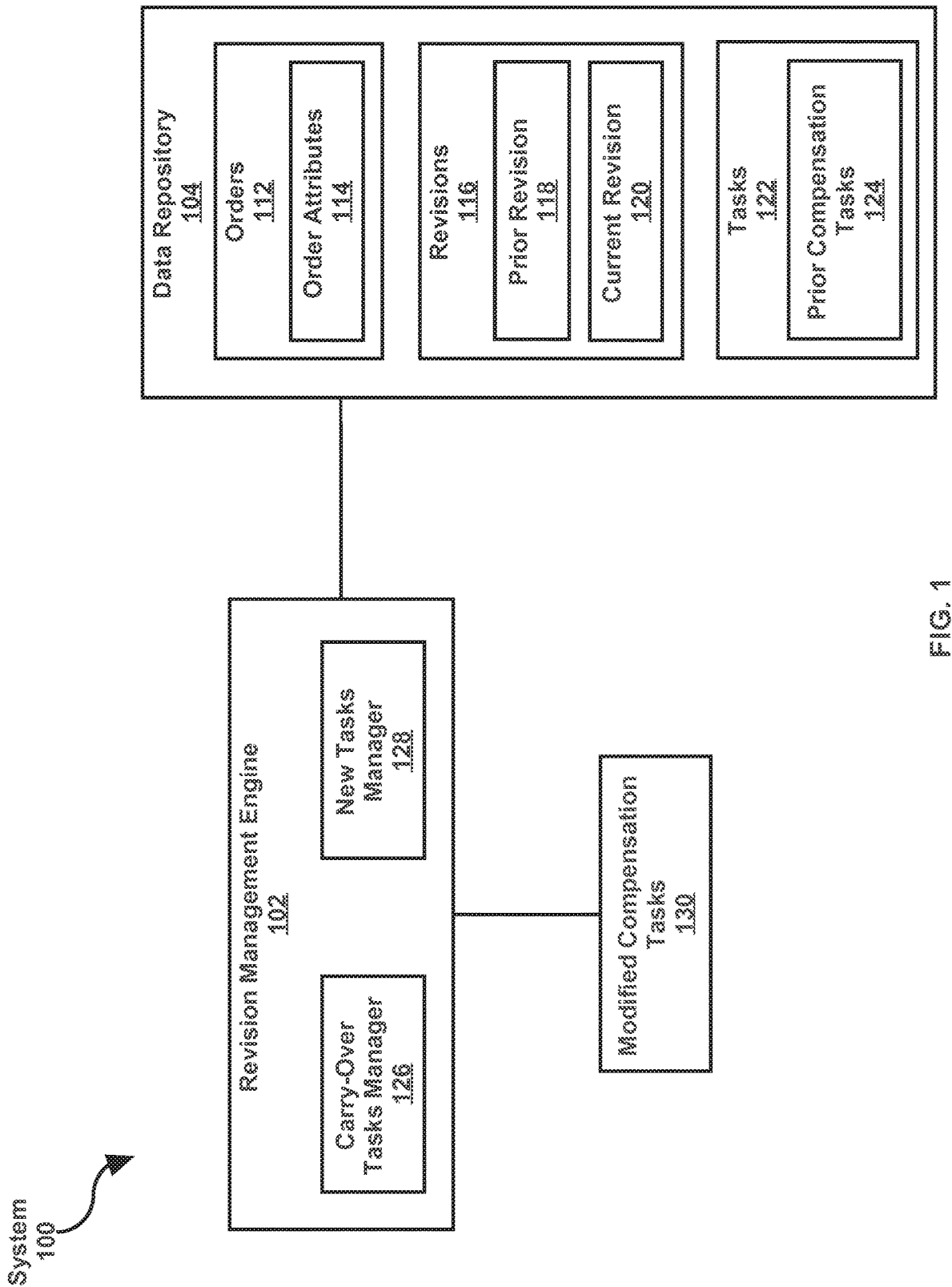
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. IDENTIFY AND EXECUTE A MODIFIED SET OF COMPENSATION TASKS BASED ON A CURRENT REVISION
   3.1 CARRY OVER COMPENSATION TASKS ASSOCIATED WITH A PRIOR REVISION INTO THE MODIFIED SET OF COMPENSATION TASKS
   3.2 ADD COMPENSATIONS TASKS TO THE MODIFIED SET OF COMPENSATION TASKS
4. MISCELLANEOUS; EXTENSIONS
5. HARDWARE OVERVIEW

1. General Overview

In one or more embodiments, multiple revisions to an order are received in succession. While at least a subset of the compensation tasks for a prior revision are not completed or are in-progress, a current revision of the order is received. A modified set of compensation tasks for the current revision is identified based on (a) the subset of compensation tasks for the prior revision that are not completed and/or in-progress, and/or (b) new compensation tasks that are added based on the current revision. The modified set of compensation tasks for the current revision is executed, rather than the subset of compensation tasks for the prior revision.

In one or more embodiments, a modified set of compensation tasks for a current revision is determined by carrying over compensation tasks for a prior revision. In an example, a current revision is received before a compensation task for a prior revision is completed. The compensation task, for the prior revision, if executed would configure a particular order attribute. The current revision indicates a target value for the particular order attribute. If the target value matches a current value already configured for the particular order attribute, then the compensation task that configures the particular order attribute is not carried over into the modified set of compensation tasks. If the target value does not match the current value for the particular order attribute, then the compensation task that configures the particular order attribute is carried over.

In one or more embodiments, a modified set of compensation tasks for a current revision is determined by adding new compensation tasks. A first set of tasks and/or compensation tasks that have already been completed for the order is identified. A second set of candidate tasks to be completed for the current revision is identified. A per-task comparison between the first set and the second set is performed. Based on whether a particular task is included in the first set and/or the second set, and the values of order attributes associated with the particular task, the particular task is added as a new compensation task. The new compensation task is executed using values of order attributes indicated by the current revision.

2. Architectural Overview

FIG. 1 illustrates a system 100 in accordance with one or more embodiments. As illustrated in FIG. 1, system 100 includes a revision management engine 102 and a data repository 104. In one or more embodiments, system 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as revision management engine 102. Alternatively or additionally, data repository 104 may be on a separate computing system than revision management engine 102. Data repository 104 may be connected to revision management engine 102 via a direct connection or via a network. One or more orders 112, revisions 116, and tasks 122 may be implemented across any of components within system 100, however, are illustrated within data repository 104 for purposes of clarity and explanation.

In one or more embodiments, orders 112 correspond to requests for goods and/or services. Orders 112 may be received from a customer management relationship (CRM) system or any other system. Each order is associated with a unique order identifier. Further, each order is associated with one or more order attributes 114 for specifying the goods and/or services requested. A value for each order attribute, in a set of order attributes, may or may not be indicated by a particular order. In an example, an order for telecommunications services includes order attributes for specifying the type of telecommunications services requested and configurations for the telecommunications services. A particular order indicates that telephone services are requested, and that a voicemail feature is to be included in the telephone services. The omission of Internet services in the particular order indicates that Internet services are not requested.

In an embodiment, an order may be associated with various states indicating a status of completion. An order may be in an initial state, in-progress state, or a completed state, based on the states of the tasks 122 to be performed for completing the order. An order in an initial state means that none of the tasks 122 for the order have begun. An order in an in-progress state means that at least one of the tasks 122 for the order have begun and at least one of the tasks 122 for the order have not yet completed. An order in an in-progress state is referred to herein as an "in-flight order." An order in a completed state means that all tasks 122 for the order have been completed.

In an embodiment, an in-flight order may be associated with an amending state or a normal state. If no revisions are received, tasks for completing an order execute normally, and the order is in a normal state. If a revision is received, changes to one or more order attributes related to tasks that have already been completed may be necessary. If changes are necessary, then the order is transitioned to an amending state. After the changes are made, the order resumes a normal state.

In one or more embodiments, revisions 116 are new versions of orders 112 that are received while orders 112 are in the process of being fulfilled. In other words, revisions 116 include amendments to in-flight orders. The original order is referred to herein as a "base order." Revisions 116 may be received from a CRM system or any other system. A revision includes the order identifier of the particular order that is being amended. A revision may specify values for order attributes 114 for which values were not previously specified in an earlier version of the order (indicating that the order attributes are being newly added by the revision). A revision may omit specification of values for order attributes for which values were previously specified in an earlier version of the order (indicating that the order attributes are being removed by the revision). A revision may specify values for order attributes 114 that are the same as or different from the values that were previously specified in an earlier version of the order. In one embodiment, a revision includes a complete set of order attributes 114 specifying the goods and/or services requested by a customer.

In an embodiment, multiple revisions 116 corresponding to a particular in-flight order, such as prior revision 118 and current revision 120, may be received in succession. Prior revision 118 is a revision for which prior compensation tasks 124 have been determined (for making amendments indicated by prior revision 118) but at least one of prior compensation tasks 124 is not yet completed. A revision that is associated with at least one compensation task that has been determined and at least one compensation task that has not yet completed is referred to herein as being "in-progress." Current revision 120 is the most recent revision of an order, and is received while prior revision 118 for the order is in-progress. Current revision 120 may be referred to herein as a "revision on a revision" when current revision 120 is received while prior revision 118 is in-progress. In an example, revision R1 for a particular order is received. While revision R1 is in-progress, another revision R2 for the particular order is received. At this time, R1 is a prior revision and R2 is a current revision. Subsequently, while revision R2 is in-progress, another revision R3 for the particular order is received. At this time, R2 is a prior revision and R3 is a current revision.

In one or more embodiments, tasks 122 are individual steps that are performed to fulfill an order. Tasks 122 may be performed by human action or by a system. For example, a task performed by human action is installation of a wall jack for a telephone line at a customer's location. As another example, a task performed by a system is verification of a data connection on a telephone line. In an example, tasks may be performed by plug-in applications to a system that manages orders 112, such as an OSM system.

In an embodiment, each task is associated with one or more order attributes 114 that are used during execution of the task. Which order attributes 114 are associated with tasks 122 may be specified during a set-up phase of a system that manages orders 112. Values configured for order attributes 114 associated with a particular task may be used to determine parameters of the particular task. In an example, an order for telecommunications services includes an order attribute for specifying the requested capacity of Internet services. A first task is to verify that Internet services at the requested capacity are available. A second task is to provision Internet services at the requested capacity. A third task is to bill the customer for Internet services at the requested capacity. Execution of these tasks use the value configured for the requested capacity. If an order indicates that the value for the capacity is 20 Mbps, then the first task is to verify that Internet services at 20 Mbps is available. The second task is to provision Internet services at 20 Mbps. The third task is to bill the customer for Internet services at 20 Mbps.

In an embodiment, dependencies may exist between tasks 122. A first task depends on a second task if the result of the second task is necessary for execution of the first task. In an example, a manufacturing company receives an order for the manufacturing of 10,000 smartphones. A first task is to purchase the screen. A second task is to purchase the processor. A third task is to assemble the screen, the processor, and the other components of a smartphone. A fourth task is to bill the customer. The first task and the second task do not depend on each other. The purchasing of the screen and the purchasing of the processor are independent events. The third task depends on the first task and the second task. In order to assemble the screen and the processor, the screen and the processor must have been purchased first. The fourth task depends on the third task. In order to bill the customer, the smartphones must have been assembled first. In another example, an order for Internet services at 20 Mbps is received. A first task is to verify that Internet services at 20 Mbps is available at the customer's location. A second task is to provision Internet services at 20 Mbps. If the first task indicates that the verification has failed, the second task cannot be performed. Thus, the second task depends on the first task.

In an embodiment, tasks 122 may be associated with various states, such as initial state, in-progress state, and completed state. A task in an initial state means that performance of the task has not yet begun. A task in an in-progress state means that performance of the task has begun but has not yet been completed. A task in a completed state means that performance of the task has been completed. The state of a task that is performed by human action may be tracked by a human user and entered into a system by the human user. The state of a task that is performed by a system is tracked by the system itself.

In an embodiment, tasks 122 include prior compensation tasks 124, which are tasks that make amendments to an in-flight order, according to the order attributes 114 indicated by prior revision 118. Prior compensation tasks 124 make amendments to order attributes related to tasks that have already been completed based on an earlier version of the order. Prior compensation tasks 124 make amendments so that the tasks are completed using values for order attributes indicated by prior revision 118. An in-flight order is associated with a set of tasks in which at least one task has started and at least one task has not completed. To make amendments for completed tasks, some tasks may need to be done, redone, or undone. The tasks that need to be done, redone, or undone are referred to herein as "compensation tasks." A compensation task may be set to various execution modes, indicating whether the compensation task needs to be done, redone, or undone.

In an embodiment, a compensation task in a REDO execution mode is a task that needs to be redone. A task may have been executed previously to configure a first value for a particular order attribute. Based on a revision, the task now needs to be executed again to configure a second value for the particular order attribute. REDO performs UNDO and DO in a single operation. In an example, an order includes an order attribute for specifying a requested capacity for Internet services. The order indicates that a value for the capacity is 20 Mbps. A first task T1 is to provision Internet services at 20 Mbps. A second task T2 is to bill the customer. After task T1 is completed and before task T2 has begun, a revision upgrading the Internet services is received. The revision changes the value for the capacity to 30 Mbps. Then, task T1 is identified as a compensation task and set to a REDO execution mode. Task T1 needs to be redone at 30 Mbps, rather than 20 Mbps.

In an embodiment, a compensation task in an UNDO execution mode is a task that needs to be undone. A task may have been executed previously to configure a value for a particular order attribute. Based on a revision, the task now needs to be undone to remove the value for the particular order attribute. Tasks are undone in the reverse order in which the tasks were executed. In an example, an order for Internet services is received. A first task T1 is to assign a port for the Internet services. A second task T2 is to activate a line for the Internet services. A third task T3 is to bill the customer. After tasks T1 and T2 are completed and before task T3 has begun, a revision is received. The revision cancels the order for Internet services. Then, tasks T1 and T2 are identified as compensation tasks, and each is set to an UNDO execution mode. The compensation tasks are executed in reverse order. Thus, task T2 is undone, then task T1 is undone.

In an embodiment, a compensation task in a DO or AMEND DO execution mode is a task that needs to be added. No task may have been executed previously to configure a particular order attribute. Based on a revision, a new task now needs to be added to configure a value for the particular order attribute. DO indicates that the compensation task is performed after the order exits an amending state and resumes a normal state. AMEND DO indicates that the compensation task is performed while the order is in an amending state. Which execution mode is selected for a particular compensation task that is being added is based on whether any other compensation tasks depend on the particular compensation task. If none, then all other compensation tasks may be executed before the particular compensation task. This means that, when all other compensation tasks are executed, the order may transition from the amending state to the normal state. In the normal state, the particular compensation task may be executed. Thus, a DO execution mode is selected for the particular compensation task. On the other hand, if one or more other compensation tasks depend on the particular compensation task, then the particular compensation task needs to be executed before another compensation task. When the particular compensation task is executed, the order is still in an amending state. Thus, an AMEND DO execution mode is selected for the particular compensation task.

In an example, an order indicates that telephone services are to be provided to a customer. A first task T1 is to provision the telephone services. A second task T2 is to bill the customer. After task T1 is completed, a revision is received. The revision adds two order attributes: (1) a voicemail feature to the telephone services, and (2) Internet services at 20 Mbps. Based on the amendments indicated by the revision, the order is set to an amending state. Task T1 is identified as a compensation task. Task T1 needs to be redone, now with the voicemail feature. In addition, two new tasks T3 and T4 are identified. Task T3 is to verify that the voicemail feature is available at the customer's location. However, compensation task T1 depends on task T3; if the voicemail feature is not available, then provisioning of telephone services with the voicemail feature is not possible. Thus, an AMEND DO execution mode is selected for task T3. Meanwhile, task T4 is to provision Internet services at 20 Mbps. No other compensation tasks depend on task T4. Thus, a DO execution mode is selected for task T4.

In one or more embodiments, revision management engine 102 refers to hardware and/or software configured to perform operations described herein for managing a current revision 120 on a prior revision 118 of an order. If current revision 120 is received while prior revision 118 is in-progress, revision management engine 102 determines a set of modified compensation tasks 130 to be performed to make amendments indicated by current revision 120. Revision management engine 102 then executes modified compensation tasks 130, rather than prior compensation tasks 124. Examples of operations for managing a current revision 120 on a prior revision 118 of an order are described below with reference to FIG. 2.

In an embodiment, revision management engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and a personal digital assistant ("PDA").

In one or more embodiments, revision management engine 102 may be implemented as part of a system that manages orders 112, such as an OSM system. Further, revision management engine 102 implements carry-over manager 126 and new tasks manager 128. Carryover manager 126 refers to hardware and/or software configured to perform operations described herein for carrying over compensation tasks associated with prior revision 118 into modified compensation tasks 130 based on current revision 120. Examples of operations for carrying over compensation tasks are described below with reference to FIG. 3. New tasks manager 128 refers to hardware and/or software configured to perform operations described herein for adding compensation tasks into modified compensation tasks 130 based on current revision 120. Examples of operations for adding compensation tasks are described below with reference to FIG. 4.

Figure 2:
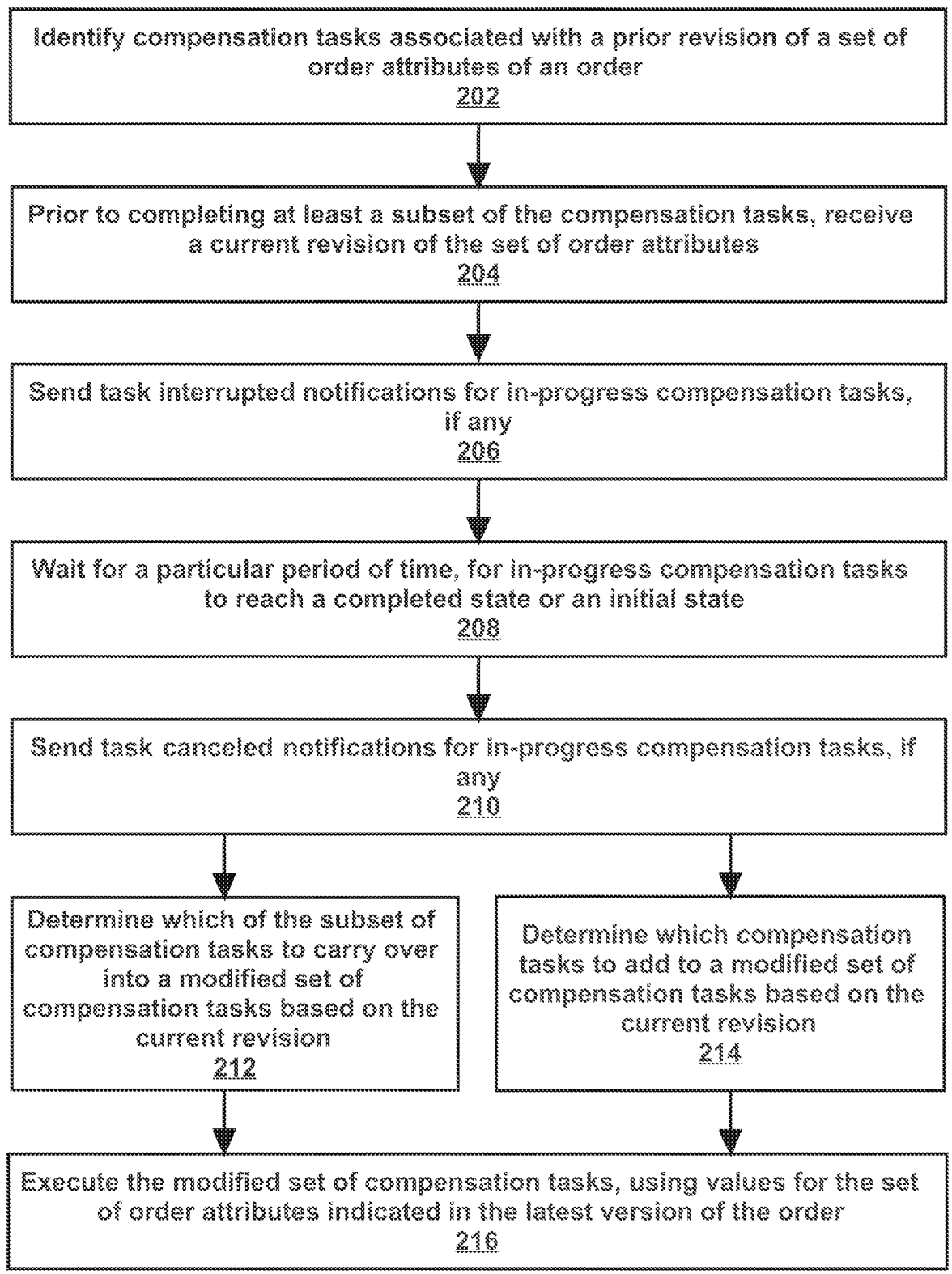
FIG. 2 illustrates an example set of operations for managing a current revision on a prior revision of an order, in accordance with one or more embodiments.

3. Identify and Execute a Modified Set of Compensation Tasks Based on a Current Revision FIG. 2 illustrates an example set of operations for managing a current revision on a prior revision of an order, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, compensation tasks associated with a prior revision of an order are identified. The prior revision includes amendments to a set of order attributes of an order (Operation 202). The prior revision may have been received from a CRM system or any other system. The order that is to be amended was identified based on an order identifier indicated by the prior revision. The prior revision was received while the order was in-progress. Some example operations for determining compensation tasks associated with the prior revision are described in U.S. patent application Ser. No. 13/315,692, filed Dec. 9, 2011, titled, "ORDER MANAGEMENT SYSTEM WITH ORDER CHANGE MANAGEMENT," which is hereby incorporated by reference. For the purposes of clarity and explanation, some example embodiments are described below.

In an embodiment, a first set of tasks (for the base order) that have been completed is identified. A second set of candidate tasks (for the prior revision) is also identified. The second set of candidate tasks is the set of tasks that would be identified for the prior revision if the prior revision were a new base order. The second set of candidate tasks is identified based on a mapping between order attributes indicated by the prior revision and available tasks.

In an embodiment, a per-task comparison between the first set and the second set is performed. If a particular task is not included in the first set but is included in the second set, then the particular task is included as a particular compensation task for the prior revision. The particular compensation task is set to a DO or AMEND DO execution mode. If no other compensation tasks (identified for the prior revision) depend on the particular compensation task, then a DO execution mode is selected. If one or more other compensation tasks (identified for the prior revision) depend on the particular compensation task, then an AMEND DO execution mode is selected.

If a particular task is included in the first set but is not included in the second set, then the particular task is included as a particular compensation task for the prior revision. The particular compensation task is set to an UNDO execution mode.

If a particular task is included in both the first set and the second set, and the values of order attributes associated with the particular task in the first set are different from the values of order attributes associated with the particular task in the second set, then the particular task is included as a particular compensation task for the prior revision. The particular compensation task is set to a REDO execution mode.

If a particular task is included in both the first set and the second set, and the values of order attributes associated with the particular task in the first set are same as the values of order attributes associated with the particular task in the second set, then the particular task is not included as a compensation task for the prior revision.

In an example, an order for manufacturing a laptop includes a first order attribute A1 and a second order attribute A2. Order attribute A1 is a Bluetooth® standard to be served by the laptop (Bluetooth® is a trademark of the Bluetooth Special Interest Group). Order attribute A2 is whether to include a disc player. Order attributes A1 and A2 are mapped to tasks. A first task T1, for the order, is to procure a keyboard. A second task T2 is to procure a Bluetooth component for the desired Bluetooth standard. A third task T3 is to procure a disc player. A fourth task T4 is to assemble all requested components. A fifth task T5 is to bill the customer for the laptop with the requested components.

A particular order indicates the following values for the order attributes. For order attribute A1, Bluetooth 2.0 is to be served. For order attribute A2, a disc player is to be included.

Execution of task T2 uses the order attribute A1. Based on the value specified by the order, task T2 is defined as procuring a Bluetooth component for Bluetooth 2.0. Execution of task T3 uses the order attribute A2. Based on the value specified by the order, task T3 is defined as procuring a disc player. Execution of task T4 uses order attributes A1 and A2. Based on the values specified by the order, task T4 is to assemble the keyboard, the Bluetooth component for Bluetooth 2.0, and the disc player. Execution of task T5 uses order attributes A1 and A2. Based on the values specified by the order, task T5 is to bill the customer for a laptop with a keyboard, a Bluetooth component for Bluetooth 2.0, and a disc player. A summary of the tasks, for fulfilling the order, is represented in Table 1 below.

TABLE 1

| Order State | Task | Attributes Used by the Task | Values Indicated by Order |
|---|---|---|---|
| Normal | T1 | [None] | |
| Normal | T2 | A1: Bluetooth Standard | Bluetooth 2.0 |
| Normal | T3 | A2: Whether to include a disc player | Yes |
| Normal | T4 | A1: Bluetooth Standard | Bluetooth 2.0 |
| | | A2: Whether to include a disc player | Yes |
| Normal | T5 | A1: Bluetooth Standard | Bluetooth 2.0 |
| | | A2: Whether to include a disc player | Yes |

After task T4 is completed but before task T5 has begun, a revision is received. In this example, the revision includes a complete set of order attributes for the order. The revision indicates the following values for the order attributes. For order attribute A1, Bluetooth 4.0 is to be served. For order attribute A2, no value is indicated. The omission of a value for order attribute A2 means that no disc player is to be included.

A candidate set of tasks for the revision is identified, as if the revision were a new base order. Based on the values of order attributes A1 and A2, specified by the revision, task T2 is to procure a Bluetooth component for Bluetooth 4.0, task T3 is not necessary, task T4 is to assemble the keyboard and the Bluetooth component for Bluetooth 4.0, and task T5 is to bill the customer for a laptop with a keyboard and a Bluetooth component for Bluetooth 4.0. A summary of the tasks, for fulfilling the revision as if it were a new base order, is represented in Table 2 below.

TABLE 2

| Order State | Task | Attributes Used by the Task | Values Indicated by Revision |
|---|---|---|---|
| Normal | T1 | [None] | |
| Normal | T2 | A1: Bluetooth Standard | Bluetooth 4.0 |
| Normal | T4 | A1: Bluetooth Standard | Bluetooth 4.0 |
| Normal | T5 | A1: Bluetooth Standard | Bluetooth 4.0 |

A per-task comparison between (a) the tasks for fulfilling the order that have been completed (referred to as the "first set," in this example) and (b) the tasks for fulling the revision as if it were a new base order (referred to as the "second set," in this example) is performed. T1 is included in both the first set and the second set. There are no differences in the values of order attributes used by T1. Thus, T1 is not included as a compensation task for the revision. T2 is included in both the first set and the second set. The value of order attribute A1 used by T2 in the first set (Bluetooth 2.0) and the value of order attribute A1 used by T2 in the second set (Bluetooth 4.0) are different. Thus, T2 is included as a compensation task for the revision, and set to a REDO execution mode. T3 is included in the first set but not in the second set. Thus, task T3 is included as a compensation task for the revision, and set to an UNDO execution mode. Task T4 is included in both the first set and the second set. The order attributes used by T4 in the first set (A1 and A2) and the order attributes used by T4 in the second set (A1) are different. Thus, task T4 is included as a compensation task for the revision, and set to a REDO execution mode. Finally, task T5 is not included in the comparison, since task T5 has not yet been completed for the order.

A summary of the compensation tasks, for the revision, is represented in Table 3 below.

TABLE 3

| Order State | Task | Mode | Attributes Used by the Task | Values Indicated by Revision |
|---|---|---|---|---|
| Amending | T2 | REDO | A1: Bluetooth Standard | Bluetooth 4.0 |
| Amending | T3 | UNDO | A2: Whether to include a disc player | [None] |
| Amending | T4 | REDO | A1: Bluetooth Standard | Bluetooth 4.0 |
| | | | A2: Whether to include a disc player | [None] |

In one or more embodiments, after the compensation tasks, for the prior revision, are identified, and prior to completing at least a subset of the compensation tasks, a current revision of the set of order attributes is received (Operation 204). The current revision may be received from a CRM system or any other system. The order that is to be amended is identified based on an order identifier indicated by the current revision. The current revision may be received while the prior revision is in-progress, that is, at least one compensation task for the prior revision has been determined and at least one compensation task for the prior revision has not completed. Whether the prior revision is in-progress may be determined based on the states of the order and/or the compensation tasks. In an embodiment, when a current revision of an order is received, the order is in an amending state. In the amending state, at least one compensation task for the prior revision has been determined and is in an initial state. This indicates that the current revision is a revision on an in-progress revision. In another embodiment, when the current revision is received, at least one compensation task for the prior revision is in an in-progress state. This indicates that the current revision is a revision on an in-progress revision.

In one or more embodiments, task-interrupted notifications are sent for in-progress tasks and/or compensation tasks, if any (Operation 206). For a task that is performed by human action, the task-interrupted notification may be sent to a human user who is responsible for performing the task. The task-interrupted notification may be displayed on a screen, when the human user logs onto the system. For a task that is performed by a system, the task-interrupted notification may be sent to the system.

In an embodiment, a task-interrupted notification for an in-progress task may trigger the human user or the system to accelerate processing of the task in order to reach a completed state more quickly, or to roll back the task to an initial state if that is simpler than reaching a completed state. In an example, a task may be to install servers at a customer's site. A technician needs to go out to the customer's site to perform this manual task. A technician receives the task from the system. The technician then updates the task to an in-progress state in the system. The technician calls the customer to set up an appointment to visit the customer's site on the next day. Meanwhile, before the visit to the customer's site is made, a revision is received. A task-interrupted notification is sent for this task. Since it is simpler to roll back the task to an initial state, rather than to visit the customer's site, the technician transitions the task back to the initial state in the system. In another example, a task may be to make certain settings on a port at a customer's site. A technician receives the task and updates the task to an in-progress state in the system. After the technician has visited the customer's site and made the desired settings, but before the technician updates the task to a completed state in the system, a revision is received. A task-interrupted notification is sent for this task. Based on the task-interrupted notification, the technician may then prioritize updating the task to a completed state in the system.

In an embodiment, a task and/or compensation task may or may not be subscribed to a task-interrupted notification. Whether a task and/or compensation task is subscribed to a task-interrupted notification may be determined during a set-up phase of the system. The task-interrupted notification may be sent for only the in-progress tasks and/or compensation tasks that are subscribed.

In one or more embodiments, the system waits for a particular period of time, for in-progress tasks and/or compensation tasks to reach a completed state or an initial state (Operation 208). The particular period of time may be referred to herein as a "grace period." During the grace period, no new compensation tasks are started. The grace period ends (a) when all in-progress tasks and/or compensation tasks reach a completed state or an initial state, or (b) at the end of a maximum time period. The maximum time period may be fixed or dynamically set. In an example, the maximum time period may be determined based on the complexity of the in-progress tasks. A first in-progress task is to verify whether Internet services at 20 Mbps is available at a customer's location. A second in-progress task is to ship a router to the customer's location. The estimated shipment time is five days. The second task is more complex than the first task, since more actions and a lengthier time are required for completing the second task. Thus, the maximum time period for the grace period is determined based on the complexity of the second task. At the end of the grace period, the order transitions from a normal state to an amending state.

In one or more embodiments, task-canceled notifications are sent for in-progress tasks and/or compensation tasks, if any (Operation 210). A task-canceled notification is sent for a task and/or compensation task that remains in the in-progress state at the expiration of the maximum time period for the grace period. A task-canceled notification may serve as an error message indicating that the status of completion for the task remains unknown. The task may remain in an in-progress state, or may be transitioned back to an initial state, in the system. However, the task may not be transitioned to a completed state. In an example, while a first compensation task is in-progress, a revision is received by the system. A grace period is initiated, during which no new compensation tasks are begun. The system waits for the first compensation task to reach a completed state or an initial state, up until a maximum time period. As the maximum time period passes, the first compensation task is still in an in-progress state. Then, a task-canceled notification for the first compensation task is sent. The system may transition the first compensation task back to an initial state, as if the first compensation task had not been started.

In an embodiment, a task and/or compensation task may or may not be subscribed to a task-canceled notification. Whether a task and/or compensation task is subscribed to a task-canceled notification may be determined during a set-up phase of the system. The task-canceled notification may be sent for only the in-progress tasks and/or compensation tasks that are subscribed.

In one or more embodiments, a modified set of compensations tasks is determined based on the current revision. The modified set of compensation tasks may be determined by carrying over one or more compensation tasks, associated with the prior revision, that have not yet been completed (Operation 212). Examples of operations for carrying over compensation tasks are described below with reference to FIG. 3. Alternatively or additionally, the modified set of compensation tasks may be determined by adding new compensation tasks (Operation 214). Examples of operations for adding compensation tasks are described below with reference to FIG. 4.

In one or more embodiments, the modified set of compensation tasks is executed, using the values for the set of order attributes indicated by the latest version of the order (Operation 216). The latest version of the order is the current revision received at Operation 204.

In an example, an order for telecommunication services includes two order attributes:
Order attribute A1: Whether to provide Internet services
Order attribute A2: Capacity of Internet services
Tasks for the order include:
Task T1: Verify that Internet services at the requested capacity is available
Task T2: Assign a port for the customer
Task T3: Activate Internet services
Task T4: Bill the customer
An order O is received. O indicates the following values for the order attributes:
Order attribute A1: Yes, provide Internet services
Order attribute A2: Requested capacity is 20 Mbps
After tasks T1, T2, and T3 are completed, and before task T4 has begun, a first revision R1 is received. Revision R1 indicates that the requested capacity is 30 Mbps (rather than 20 Mbps), and values for the remaining order attributes remain the same. Tasks T1, T2, and T3 are identified as compensation tasks for revision R1.

Compensation task T1 is executed, in a REDO execution mode, using the value for the requested capacity indicated by the revision R1, which is 30 Mbps. After compensation task T1 is completed, and before compensation task T2 is begun, a second revision R2 is received. Revision R2 indicates that the requested capacity is 40 Mbps (rather than 30 Mbps), and values for the remaining order attributes remain the same. Task T1 is identified as a compensation task for revision R2.

Compensation task T1 is executed, in a REDO execution mode, using the value for the requested capacity indicated by the revision R2, which is 40 Mbps.

Figure 3:
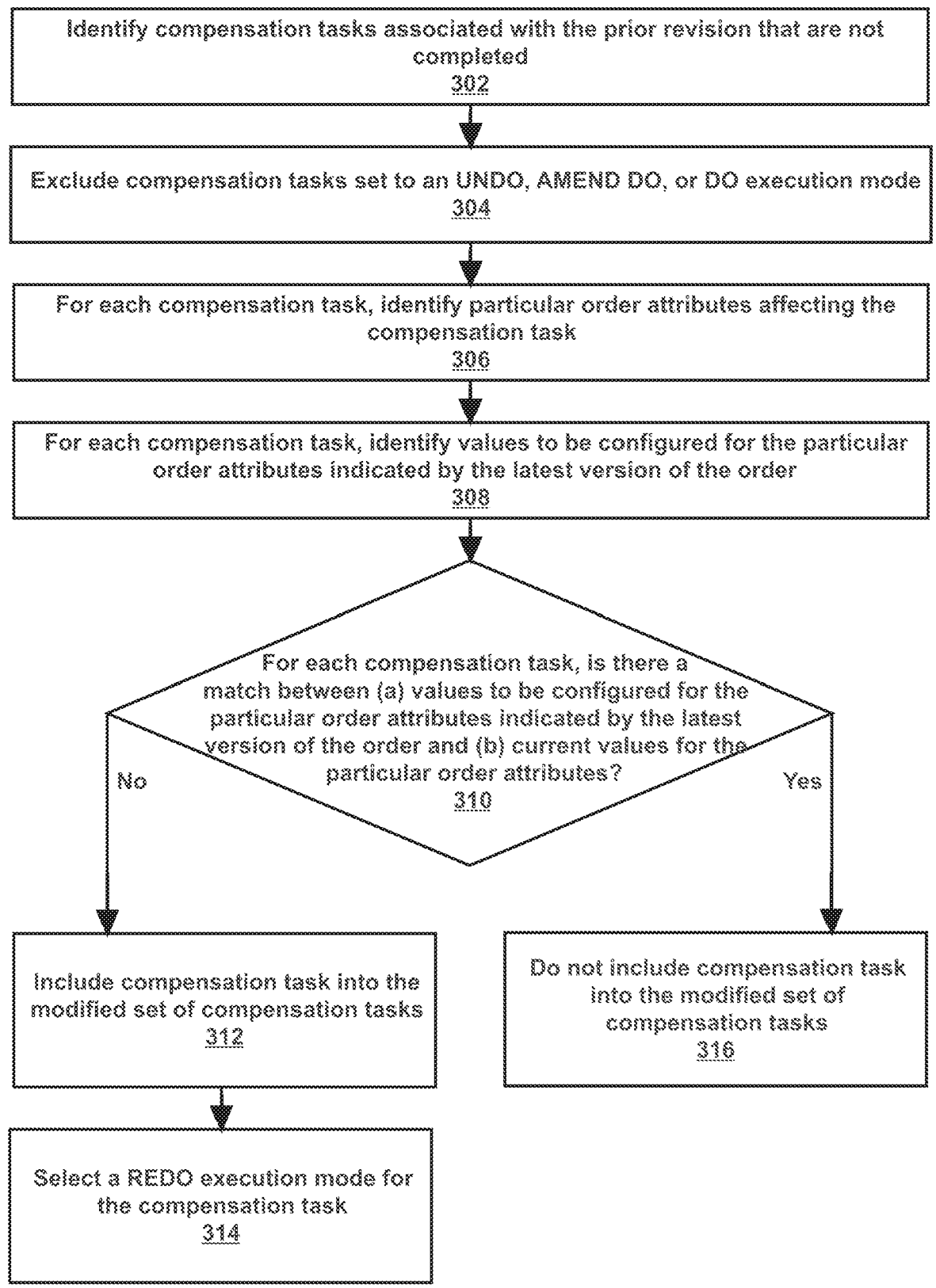
FIG. 3 illustrates an example set of operations for carrying over compensation tasks, for a prior revision, into a modified set of compensation tasks, for a current revision.

3.1 Carry Over Compensation Tasks Associated with a Prior Revision into the Modified Set of Compensation Tasks FIG. 3 illustrates an example set of operations for carrying over compensation tasks, for a prior revision, into a modified set of compensation tasks, for a current revision. As described above, the current revision has been received while the prior revision was in-progress. That means, at least one compensation task for the prior revision has begun, and at least one compensation task for the prior revision has not been completed. One or more operations illustrated in FIG. 3 may be modified, rearranged, or omitted all together. Accordingly, the particular sequence of operations illustrated in FIG. 3 should not be construed as limiting the scope of one or more embodiments.

Initially, compensation tasks associated with the prior revision that are not yet completed are identified (Operation 302). Whether a compensation task has been completed may be determined based on the state of the compensation task. In an example, the compensation tasks that are in an initial state or an in-progress state, at the expiration of the grace period, are identified.

In one or more embodiments, compensation tasks associated with the prior revision that are set to an UNDO, AMEND DO, or DO execution modes are excluded (Operation 304). In an example, only compensation tasks set to a REDO execution mode may be carried over. While compensation tasks set to an UNDO, AMENDO DO, or DO execution mode are excluded, these compensation tasks may or may not be added into the modified set of compensation tasks, based on the current revision, as illustrated at Operation 214 of FIG. 2. Further examples of operations for adding compensation tasks are described below with reference to FIG. 4.

In one or more embodiments, particular order attributes used by each compensation task are identified (Operation 306). Order attributes used by a compensation task include order attributes that are associated with the compensation task, as specified during a set-up phase of the system. Order attributes used by a compensation task may be identified based on the information necessary to complete the task. In an example, a compensation task may be to ship a router to a customer's location. Order attributes used by this compensation task may include the model number of the router, and the address of the customer's location. These order attributes provide information necessary for the task of shipping a router to the customer's location. In another example, a compensation task may be to assemble components of a laptop that is being manufactured. Order attributes used by this compensation task may include which components to be included in the laptop, such as a screen, a network card, and a memory. Order attributes used by this compensation task may also include the configurations of these components, such as whether the screen is a touchscreen, the communications protocol to be supported by the network card, and the size of the memory.

In one or more embodiments, values to be configured for the particular order attributes used by each compensation task, as indicated by the latest version of the order, are identified (Operation 308). In an embodiment, the values are identified from a current revision of the order. In an example, an order O may indicate that a Gold-level cable TV service is to be provided to a customer. A first revision R1 may indicate that a Silver-level cable TV service is to be provided to the customer. Then, the level of cable TV service to be used by a compensation task would be Silver-level, as indicated by revision R1.

In one or more embodiments, an inquiry regarding the particular order attributes used by each compensation task is made. The inquiry determines whether there is a match between (a) values to be configured for the particular order attributes, as indicated by the latest version of the order, and (b) current values for the particular order attributes, as configured by tasks that are now in a completed state (Operation 310). A current value for an order attribute may be determined by determining the value of the order attribute at the time the task was last completed. A match between the two values may be found if the values are the same, within a predefined range, or satisfy other common criteria. In an example, an order O indicates that Internet services are to be provided to an executive office, and that the capacity of the Internet services is 20 Mbps. A first task T1, for fulfilling order O, is to verify whether Internet service at the desired capacity is available. A second task T2 is to provision the Internet services to the selected offices. After task T1 is completed and before task T2 has begun, a first revision R1 is received. Revision R1 indicates that the Internet services are to be provided to the executive office and the conference room. The capacity remains at 20 Mbps. The value for the capacity indicated by revision R1 (20 Mbps) is compared to the current value for the capacity (20 Mbps). Since the capacity is the same for order O and revision R1, a match is found.

In one or more embodiments, if a match is not found between (a) the value for an order attribute indicated by the latest version of the order and (b) the current value for the order attribute, then a particular compensation task that uses the order attribute is included into the modified set of compensation tasks (Operation 312). The compensation task, originally associated with the prior revision, is carried over into a modified set of compensation tasks, now associated with the current revision. In an example, an order O indicates that Internet services at 20 Mbps are to be provided and that telephone services are to be provided. A first task T1, for completing order O, is to verify whether Internet service at the desired capacity is available. A second task T2 is to provision the Internet services. A third task T3 is to provision the telephone services. A fourth task T4 is to bill the customer. After tasks T1 and T2 are completed and before task T3 has begun, a first revision R1 is received. Revision R1 indicates that Internet services at 30 Mbps are to be provided. The value for the capacity indicated by revision R1 (30 Mbps) is compared to the current value for the capacity (20 Mbps). A match is not found. Since execution of tasks T1 and T2 use the order attribute for specifying the capacity, tasks T1 and T2 are identified as compensation tasks, for revision R1. Tasks T1 and T2 are set to a REDO execution mode. After task T1 is completed in the REDO execution mode, and before task T2 has begun, a second revision R2 is received. Revision R2 indicates that a cancellation of the telephone services. Task T2 is a compensation task for revision R1 that has not yet been completed. The order attribute for specifying a capacity for the Internet services is used by task T2. The latest version of the order that indicates a value to be configured for the capacity is revision R1. The value for the capacity indicated by revision R1 (30 Mbps) is compared to the current value for the capacity (20 Mbps). A match is not found. Accordingly, task T2 is included into the modified set of compensation tasks for revision R2. In other words, task T2 is carried over from the compensation tasks, for revision R1, into the modified set of compensation tasks, for revision R2.

In one or more embodiments, the compensation task that has been included into the modified set of compensation task is set to a REDO execution mode (Operation 314). A compensation task that has been carried over at Operation 312 is a compensation task that uses an order attribute that is already configured to a current value. However, a different value for this order attribute is indicated by the current revision. Thus, the compensation task, which has been carried over, needs to be set to a REDO execution mode. In the REDO execution mode, the task may be executed again, using the value for this order attribute as indicated by the current revision.

In one or more embodiments, if a match is found between (a) the value, indicated by the latest version of the order, for each order attribute and (b) the current value for each order attribute, then the particular compensation task, that uses the order attributes, is not included into the modified set of compensation tasks (Operation 316). Since the current value already configured for the order attribute matches the value indicated by the current revision, no compensation task is needed to modify a value for this order attribute. No compensation task is needed, regardless of whether a value for this order attribute, as indicated by the prior revision, matches the current value for this order attribute. In an example, an order O for the manufacturing of smartphones indicates that a memory of 2 GB is to be included in the smartphones. A task T, for the order O, is to procure memories. Order O indicates that the memories to be procured are 2 GB each. After task T is completed, a first revision R1 is received. R1 indicates that the memory size is 4 GB instead of 2 GB. The value for the memory size as indicated by revision R1 (4 GB) does not match the current value for the memory size (2 GB). Task T, for procuring memories, is included as a compensation task for revision R1. Before the compensation task T, for revision R1, is begun, a second revision R2 is received. Revision R2 indicates that the memory size is 2 GB, as originally ordered. The value for the memory size as indicated by Revision R2 (2 GB) matches the current value for the memory size (2 GB). Thus, the compensation task T is not carried over into the modified set of compensation tasks for Revision R2. The compensation task T is not carried over, even though the value for the memory size as indicated by revision R1 (4 GB) does not match the current value for the memory size (2 GB).

3.2 Add Compensations Tasks to the Modified Set of Compensation Tasks

Figure 4:
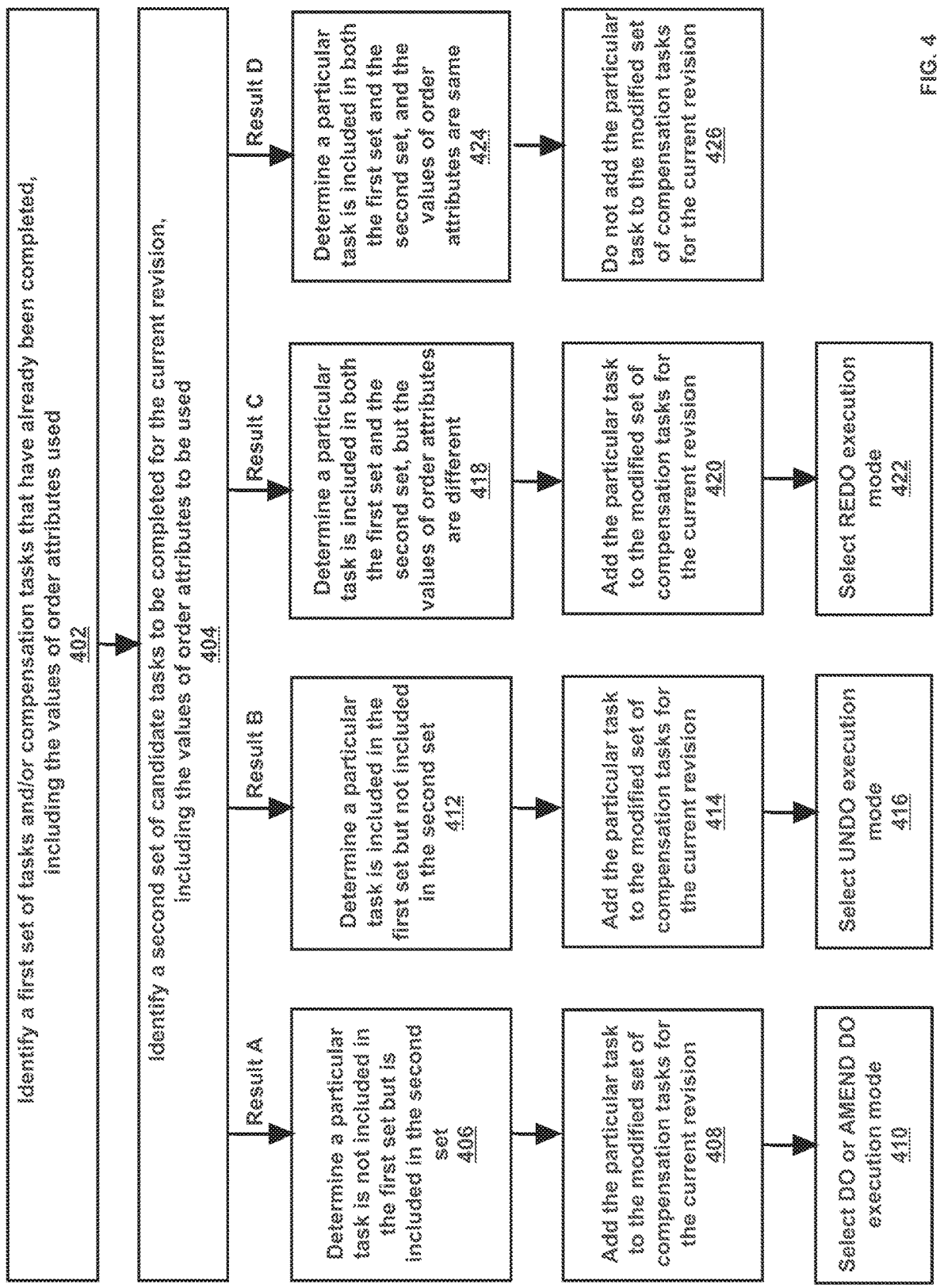
FIG. 4 illustrates an example set of operations for adding compensation tasks into a modified set of compensation tasks, for a current revision.

FIG. 4 illustrates an example set of operations for adding compensation tasks into a modified set of compensation tasks, for a current revision. As described above, the current revision has been received while the prior revision was in-progress. That means, at least one compensation task for the prior revision has been determined but has not been completed. One or more operations illustrated in FIG. 4 may be modified, rearranged, or omitted all together. Accordingly, the particular sequence of operations illustrated in FIG. 4 should not be construed as limiting the scope of one or more embodiments.

In one or more embodiments, operations for determining compensation tasks to be added into the modified set of compensation tasks are similar to the example operations for determining compensation tasks associated with a revision as described in U.S. patent application Ser. No. 13/315,692, filed Dec. 9, 2011, titled, "ORDER MANAGEMENT SYSTEM WITH ORDER CHANGE MANAGEMENT," which is hereby incorporated by reference. For the purposes of clarity and explanation, some example embodiments are described below.

Initially, a first set of tasks and/or compensation tasks that have already been completed is identified. The values of order attributes used by the first set of tasks and/or compensation tasks are also identified (Operation 402). The state of each tasks and/or compensation tasks, for the particular order, are identified. The tasks and/or compensation tasks associated with a completed state are identified in the first set.

In an example, tasks T1, T2, and T3 are identified for an order O. After tasks T1 and T2 are completed, and before task T3 has begun, a first revision R1 is received. Tasks T1 and T2 are identified as compensation tasks for revision R1. After compensation task T1 has completed and before compensation task T2 has begun, a second revision R2 is received. Task T2 and compensation task T1 are in completed states and included in the first set. The values of order attributes indicated by order O were used by task T2. The values of order attributes indicated by revision R1 were used by compensation task T1.

In one or more embodiments, a second set of candidate tasks to be completed for the current revision is identified. The values of order attributes to be used by the second set of candidate tasks are also identified (Operation 404). The second set of candidate tasks are the tasks that would be determined for the current revision if the current revision were a new base order. The tasks are determined based on a mapping between order attributes associated with the current revision and available tasks. The values of order attributes to be used are indicated by the current revision.

In one or more embodiments, a per-task comparison is made between the first set, identified at Operation 402, and the second set, identified Operation 404. Each task in the first set is compared to each task in the second set. Values of order attributes used by a task in the first set are compared to values of order attributes used by the task in the second set. At least the following results, referred to herein as Result A, Result B, Result C, and Result D, may be determined based on each comparison, as explained below.

In one or more embodiments, Result A is determined based on the per-task comparison, for a particular task in the first set and/or the second set. Result A refers to a determination that the particular task is not included in the first set but is included in the second set (Operation 406). In an example, a first revision R1 to an in-flight order requests telephone services. A compensation task T1 for revision R1 is determined to be provisioning telephone services. After compensation task T1 is completed, and before at least one other of the compensation tasks for revision R1 has completed, a second revision R2 is received. Revision R2 requests Internet services in addition to telephone services. Candidate tasks are determined for revision R2, as if revision R2 were a new base order. A candidate task T2 for revision R2 is determined to be provisioning Internet services. (Task T1 is also a candidate task for revision R2.) Task T2 is determined to be not included in the first set of tasks and/or compensation tasks that have been completed but is included in the second set of candidate tasks to be completed for revision R2. Therefore, Result A is found for task T2.

In one or more embodiments, based on Result A, the particular task is added to the modified set of compensation tasks for the current revision (Operation 408). Continuing the example above, task T2, for provisioning Internet services, is added to the modified set of compensation tasks for the current revision.

In one or more embodiments, a DO or AMEND DO execution mode is selected for the particular compensation task added at Operation 408 (Operation 410). Since the particular compensation task needs to be done, and has not been done before, a DO or AMEND DO execution mode applies. If no other compensation tasks depend on a compensation task that is being added, a DO execution mode is selected for the compensation task that is being added. The newly added compensation task may be executed after all other compensation tasks are completed, and the order resumes a normal state. On the other hand, if at least one other compensation task depends on a compensation task that is being added, and the compensation task that is being added needs to be performed while the order is in an amending state, then an AMEND DO execution mode is selected for the compensation task that is being added.

In one or more embodiments, Result B is determined based on the per-task comparison, for a particular task in the first set and/or the second set. Result B refers to a determination that the particular task is included in the first set but is not included in the second set (Operation 412). In an example, a first revision R1 to an in-flight order requests telephone services. A compensation task T1 for revision R1 is determined to be provisioning telephone services. After compensation task T1 is completed, and before at least one other of the compensation tasks for revision R1 has completed, a second revision R2 is received. Revision R2 requests Internet services instead of telephone services. Candidate tasks are determined for revision R2, as if revision R2 were a new base order. Task T1 is not a candidate task for revision R2. Task T1 is determined to be included in the first set of tasks and/or compensation tasks that have been completed but is not included in the second set of candidate tasks to be completed for revision R2. Therefore, Result B is found for task T1.

In one or more embodiments, based on Result B, the particular task is added to the modified set of compensation tasks for the current revision (Operation 414). Continuing the example above, task T1, for provisioning telephone services, is added to the modified set of compensation tasks for the current revision.

In one or more embodiments, an UNDO execution mode is selected for the particular compensation task added at Operation 414 (Operation 416). Since the particular compensation task was previously done, but no longer needs to be done, an UNDO execution mode applies. Continuing the example above, task T1, for provisioning telephone services, is set to an UNDO execution mode, due to the cancellation of telephone services indicated by revision R2.

In one or more embodiments, Result C is determined based on the per-task comparison, for a particular task in the first set and/or the second set. Result C refers to a determination that the particular task is included in both the first set and the second set, but the values of order attributes associated with the particular task in the first set are different from the values of order attributes associated with the particular task in the second set (Operation 418). In an example, a first revision R1 to an in-flight order requests Internet services at a capacity of 20 Mbps. A compensation task T1 for revision R1 is determined to be verifying the availability of the requested capacity. After compensation task T1 is completed using the value of 20 Mbps, and before at least one other of the compensation tasks for revision R1 has completed, a second revision R2 is received. Revision R2 requests Internet services at a capacity of 30 Mbps (instead of 20 Mbps). Candidate tasks are determined for revision R2, as if revision R2 were a new base order. Task T1 is a candidate task for revision R2. Task T1 is to be executed using the value of 30 Mbps, as indicated by revision R2. Task T1 is determined to be included in both the first set of tasks and/or compensation tasks that have been completed and the second set of candidate tasks to be completed for revision R2. However, the requested capacity used by task T1 in the first set is 20 Mbps, while the requested capacity to be used by task T1 in the second set is 30 Mbps. Therefore, Result C is found for task T1.

In one or more embodiments, based on Result C, the particular task is added to the modified set of compensation tasks for the current revision (Operation 420). Continuing the example above, task T1, for verifying the availability of the requested capacity, is added to the modified set of compensation tasks for revision R2.

In one or more embodiments, a REDO execution mode is selected for the particular compensation task added at Operation 420 (Operation 422). Since the particular compensation task was previously done using a first value for a particular order attribute, but needs to be done again using a second value for the particular order attribute, a REDO execution mode applies. Continuing the example above, task T1 is set to a REDO execution mode. Task T1 is to be executed using 30 Mbps, as indicated by revision R2.

Alternatively, UNDO and DO execution modes may be selected for the particular compensation task added at Operation 420, since, as previously explained, REDO performs UNDO and DO in a single operation. Using the example above again, task T1 may be included twice in the modified set of compensation tasks for revision R2. The first instance of task T1 may be set to an UNDO execution mode. The task of verifying the availability of 20 Mbps, as indicated by revision R1, is undone. The second instance of task T1 may be set to a DO execution mode. The task of verifying the availability of 30 Mbps, as indicated by revision R2, is done.

In one or more embodiments, Result D is determined based on the per-task comparison, for a particular task in the first set and/or the second set. Result D refers to a determination that a particular task is included in both the first set and the second set, and values of order attributes associated with the particular task in the first set are the same as the values of order attributes associated with the particular task in the second set (Operation 424). In an example, a first revision R1 to an in-flight order requests Internet services at a capacity of 20 Mbps and telephone services. A compensation task T1 for revision R1 is determined to be verifying the availability of the requested capacity of Internet services. Another compensation task T2 for revision R1 is determined to be provisioning telephone services. After compensation tasks T1 and T2 are completed, and before at least one other of the compensation tasks for revision R1 has completed, a second revision R2 is received. Revision R2 requests Internet services at a capacity of 30 Mbps (instead of 20 Mbps) and telephone services. Candidate tasks are determined for revision R2, as if revision R2 were a new base order. Tasks T1 and T2 are candidate tasks for revision R2. Therefore, tasks T1 and T2 are included in both the first set and the second set. Meanwhile, different requested capacities are associated with task T1 in the first set and the second set. However, the same values of order attributes are associated with task T2 in the first set and the second set. Therefore, Result D is found for task T2 (and Result C is found for task T1).

In one or more embodiments, based on Result D, the particular compensation task is not added to the modified set of compensation tasks for the current revision (Operation 426). Continuing the example above, task T2 is not added to the modified set of compensation tasks for revision R2.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
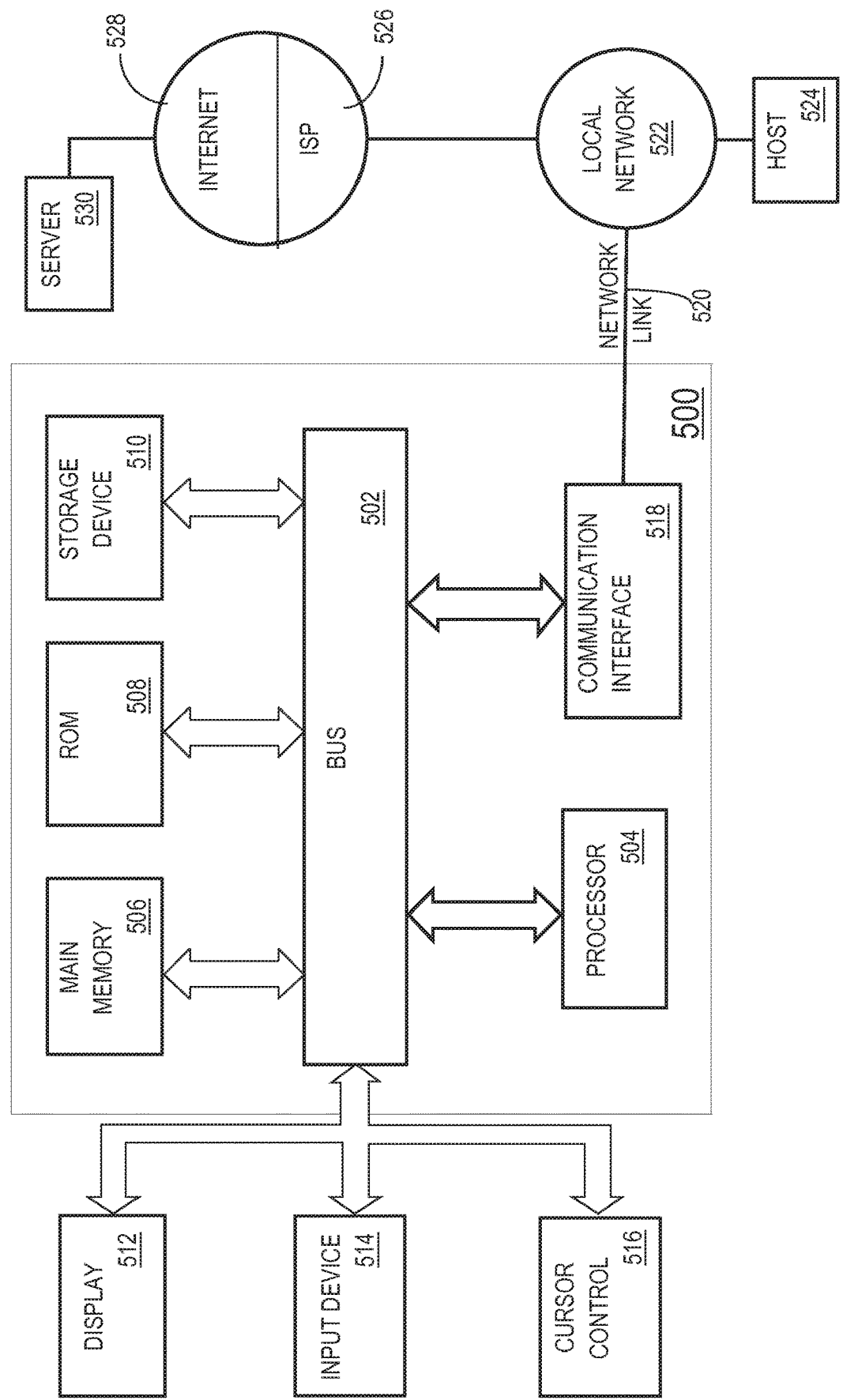
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    storing, by an order management system, a first orchestration plan comprising a first plurality of compensation tasks associated with a first revision of an order, wherein the order is associated with a set of order attributes;
    wherein the first orchestration plan comprises a first metadata-driven executable orchestration process that comprises at least the first plurality of compensation tasks for fulfilling the order;
    wherein the first orchestration plan manages fulfillment of the order by one or more fulfillment providers that interface with the order management system using a computer network;
    subsequent to completing a first subset of compensation tasks in the first plurality of compensation tasks and prior to completing a second subset of compensation tasks in the first plurality of compensation tasks, electronically receiving a request for a second revision of the order;
    suspending the first orchestration plan;
    generating a second orchestration plan comprising a second plurality of compensation tasks associated with the second revision of the order, wherein generating the second orchestration plan comprises:
        determining a particular set of tasks based on the second revision of the order;
        responsive to determining that a particular order attribute is used by at least a first compensation task of the first subset of compensation tasks and is not used by the particular set of tasks: adding the first compensation task into the second plurality of compensation tasks;
    wherein the second orchestration plan comprises a second metadata-driven executable orchestration process that comprises at least the second plurality of compensation tasks for fulfilling the order;
    wherein the second orchestration plan manages fulfillment of the order by the one or more fulfillment providers that interface with the order management system using the computer network; and
    executing the second orchestration plan at least by transmitting a command from the order management system to the one or more fulfillment providers via the computer network.

2. The one or more media of claim 1, wherein the second plurality of compensation tasks is completed instead of the second subset of compensation tasks.

3. The one or more media of claim 1, further storing instructions, which when executed by the one or more processors, cause:
    further responsive to determining that the particular order attribute is not used by the first subset of compensation tasks and is used by the first task of the particular set of tasks: selecting an UNDO execution mode for the first compensation task.

4. The one or more media of claim 1, wherein generating the second orchestration plan further comprises:
    responsive to determining that (a) another order attribute is used by at least a second compensation task of the first subset of compensation tasks and is used by at least a first task of the particular set of tasks and (b) values to be configured for the another order attribute as indicated by the second compensation task and the first task are same: refraining from including the second compensation task or the first task in the second plurality of compensation tasks.

5. The one or more media of claim 1, wherein generating the second orchestration plan further comprises:
    responsive to determining that another order attribute is not used by the first subset of compensation tasks and is used by at least a first task of the particular set of tasks: adding the first task as a compensation task into the second plurality of compensation tasks.

6. The medium of claim 1, further storing instructions, which when executed by the one or more processors, cause:
    subsequent to electronically receiving the request for the second revision of the order: waiting for a particular period of time for any in-progress compensation tasks, in the first plurality of compensation tasks, to reach a completed state or an initial state, prior to suspending the first orchestration plan.

7. The one or more media of claim 1, wherein the particular order attribute is not used by the second subset of compensation tasks.

8. The one or more media of claim 1, wherein the order comprises a customer order for telecommunications services.

9. The one or more media of claim 1, wherein the second plurality of compensation tasks comprises at least one of:
    provisioning telephone services;
    activating or deactivating a voicemail feature to the telephone services;
    verifying a data connection on a telephone line;
    verifying Internet services at a particular capacity are available;
    provision the Internet services at the particular capacity;
    assigning a particular port to a customer; and
    provisioning television services at a particular level.

10. A method, comprising:
    storing, by an order management system, a first orchestration plan comprising a first plurality of compensation tasks associated with a first revision of an order, wherein the order is associated with a set of order attributes;

wherein the first orchestration plan comprises a first metadata-driven executable orchestration process that comprises at least the first plurality of compensation tasks for fulfilling the order;

wherein the first orchestration plan manages fulfillment of the order by one or more fulfillment providers that interface with the order management system using a computer network;

subsequent to completing a first subset of compensation tasks in the first plurality of compensation tasks and prior to completing a second subset of compensation tasks in the first plurality of compensation tasks, electronically receiving a request for a second revision of the order;

suspending the first orchestration plan;

generating a second orchestration plan comprising a second plurality of compensation tasks associated with the second revision of the order, wherein generating the second orchestration plan comprises:

determining a particular set of tasks based on the second revision of the order;

responsive to determining that a particular order attribute is used by at least a first compensation task of the first subset of compensation tasks and is not used by the particular set of tasks: adding the first compensation task into the second plurality of compensation tasks;

wherein the second orchestration plan comprises a second metadata-driven executable orchestration process that comprises at least the second plurality of compensation tasks for fulfilling the order;

wherein the second orchestration plan manages fulfillment of the order by the one or more fulfillment providers that interface with the order management system using the computer network; and executing the second orchestration plan at least by transmitting a command from the order management system to the one or more fulfillment providers via the computer network;

wherein the method is performed by one or more devices, each including at least one hardware processor.

11. The method of claim 10, wherein the second plurality of compensation tasks is completed instead of the second subset of compensation tasks.

12. The method of claim 10, further comprising:

further responsive to determining that the particular order attribute is not used by the first subset of compensation tasks and is used by the first task of the particular set of tasks: selecting an UNDO execution mode for the first compensation task.

13. The method of claim 10, wherein generating the second orchestration plan further comprises:

responsive to determining that (a) another order attribute is used by at least a second compensation task of the first subset of compensation tasks and is used by at least a first task of the particular set of tasks and (b) values to be configured for the another order attribute as indicated by the second compensation task and the first task are same: refraining from including the second compensation task or the first task in the second plurality of compensation tasks.

14. The method of claim 10, wherein generating the second orchestration plan further comprises:

responsive to determining that another order attribute is not used by the first subset of compensation tasks and is used by at least a first task of the particular set of tasks: adding the first task as a compensation task into the second plurality of compensation tasks.

15. The method of claim 10, further storing instructions, which when executed by the one or more processors, cause:

subsequent to electronically receiving the request for the second revision of the order: waiting for a particular period of time for any in-progress compensation tasks, in the first plurality of compensation tasks, to reach a completed state or an initial state, prior to suspending the first orchestration plan.

16. A system, comprising:

one or more devices, each including at least one hardware processor;

the system being configured to perform operations comprising:

storing, by an order management system, a first orchestration plan comprising a first plurality of compensation tasks associated with a first revision of an order, wherein the order is associated with a set of order attributes;

wherein the first orchestration plan comprises a first metadata-driven executable orchestration process that comprises at least the first plurality of compensation tasks for fulfilling the order;

wherein the first orchestration plan manages fulfillment of the order by one or more fulfillment providers that interface with the order management system using a computer network;

subsequent to completing a first subset of compensation tasks in the first plurality of compensation tasks and prior to completing a second subset of compensation tasks in the first plurality of compensation tasks, electronically receiving a request for a second revision of the order;

suspending the first orchestration plan;

generating a second orchestration plan comprising a second plurality of compensation tasks associated with the second revision of the order, wherein generating the second orchestration plan comprises:

determining a particular set of tasks based on the second revision of the order;

responsive to determining that a particular order attribute is used by at least a first compensation task of the first subset of compensation tasks and is not used by the particular set of tasks: adding the first compensation task into the second plurality of compensation tasks;

wherein the second orchestration plan comprises a second metadata-driven executable orchestration process that comprises at least the second plurality of compensation tasks for fulfilling the order;

wherein the second orchestration plan manages fulfillment of the order by the one or more fulfillment providers that interface with the order management system using the computer network; and executing the second orchestration plan at least by transmitting a command from the order management system to the one or more fulfillment providers via the computer network.

17. The system of claim 16, wherein the second plurality of compensation tasks is completed instead of the second subset of compensation tasks.

18. The system of claim 16, wherein the operations further comprise:
further responsive to determining that the particular order attribute is not used by the first subset of compensation tasks and is used by the first task of the particular set of tasks: selecting an UNDO execution mode for the first compensation task.

19. The system of claim 16, wherein generating the second orchestration plan further comprises:
responsive to determining that (a) another order attribute is used by at least a second compensation task of the first subset of compensation tasks and is used by at least a first task of the particular set of tasks and (b) values to be configured for the another order attribute as indicated by the second compensation task and the first task are same: refraining from including the second compensation task or the first task in the second plurality of compensation tasks.

20. The system of claim 10, wherein generating the second orchestration plan further comprises:
responsive to determining that another order attribute is not used by the first subset of compensation tasks and is used by at least a first task of the particular set of tasks: adding the first task as a compensation task into the second plurality of compensation tasks.

* * * * *

UNITED STATES PATENT AND TRADEMARK OFFICE
CERTIFICATE OF CORRECTION

PATENT NO. : 11,157,991 B2  
APPLICATION NO. : 16/504678  
DATED : October 26, 2021  
INVENTOR(S) : Corlett et al.

It is certified that error appears in the above-identified patent and that said Letters Patent is hereby corrected as shown below:

On the Title Page

On page 2, Column 2, Item (56) under Other Publications, Line 2, delete "SOM0theme" and insert -- SOM-theme --, therefor.

On page 2, Column 2, Item (56) under Other Publications, Line 12, delete "Develpment" and insert -- Development --, therefor.

On page 2, Column 2, Item (56) under Other Publications, Line 15, delete "Pokin" and insert -- Popkin --, therefor.

On page 2, Column 2, Item (56) under Other Publications, Line 21, delete "commuinications" and insert -- communications --, therefor.

On page 2, Column 2, Item (56) under Other Publications, Line 23, delete "/communicatins/" and insert -- /communications/ --, therefor.

In the Specification

In Column 13, Line 6, delete "AMENDO DO," and insert -- AMEND DO, --, therefor.

In the Claims

In Column 22, in Claim 6, Line 40, delete "medium" and insert -- one or more media --, therefor.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*